(12) United States Patent
Yoshima et al.

(10) Patent No.: US 10,777,820 B2
(45) Date of Patent: Sep. 15, 2020

(54) NON-AQUEOUS ELECTROLYTE BATTERY AND BATTERY PACK

(71) Applicant: KABUSHIKI KAISHA TOSHIBA, Minato-ku (JP)

(72) Inventors: Kazuomi Yoshima, Tokyo (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 120 days.

(21) Appl. No.: 15/262,453

(22) Filed: Sep. 12, 2016

(65) Prior Publication Data

US 2017/0179493 A1  Jun. 22, 2017

Related U.S. Application Data

(63) Continuation of application No. PCT/JP2015/085255, filed on Dec. 16, 2015.

(51) Int. Cl.

| | | |
|---|---|---|
| *H01M 4/66* | (2006.01) | |
| *H01M 10/058* | (2010.01) | |
| *H01M 2/34* | (2006.01) | |
| *H01M 10/0525* | (2010.01) | |
| *H01M 10/0583* | (2010.01) | |
| *H01M 10/0587* | (2010.01) | |
| *H01M 10/0565* | (2010.01) | |
| *H01M 4/02* | (2006.01) | |

(52) U.S. Cl.
CPC ............. *H01M 4/66* (2013.01); *H01M 2/348* (2013.01); *H01M 10/058* (2013.01); *H01M 10/0525* (2013.01); *H01M 10/0583* (2013.01); *H01M 10/0587* (2013.01); *H01M 10/0565* (2013.01); *H01M 2004/029* (2013.01); *H01M 2200/10* (2013.01); *H01M 2220/20* (2013.01); *H01M 2300/0085* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| 4,211,833 | A | 7/1980 | Einstein |
| 6,465,125 | B1 | 10/2002 | Takami et al. |
| 8,974,954 | B2 | 3/2015 | Miyazaki et al. |
| 2004/0038123 | A1 | 2/2004 | Hisamitsu et al. |
| 2007/0212604 | A1 | 9/2007 | Ovshinsky et al. |
| 2011/0177370 | A1 | 7/2011 | Kawamoto et al. |
| 2012/0021268 | A1 | 1/2012 | Mailley et al. |
| 2014/0045040 | A1* | 2/2014 | Chami ................ H01M 2/1646 429/160 |
| 2015/0072249 | A1 | 3/2015 | Yamamoto et al. |

FOREIGN PATENT DOCUMENTS

| CN | 102150300 A | 8/2011 |
| CN | 102365772 A | 2/2012 |
| JP | 2000-30746 A | 1/2000 |
| JP | 2002-75455 A | 3/2002 |
| JP | 2004-87238 A | 3/2004 |
| JP | 2012-521624 | 9/2012 |
| JP | 2012-212600 | 11/2012 |
| JP | 2014-229663 A | 12/2014 |
| JP | 2015-70143 A | 4/2015 |
| JP | 2015-79742 A | 4/2015 |
| WO | WO 2010/038312 A1 | 4/2010 |

OTHER PUBLICATIONS

International Search Report dated Mar. 8, 2016 in PCT/JP2015/085255 (submitting English translation only).
Notice of Allowance dated Feb. 28, 2017 in Japanese Patent Application No. 2016-510884.
V. Livshits, et al., "Development of a bipolar Li/composite polymer electrolyte/pyrite battery for electric vehicles" Journal of Power Sources, vol. 97-98, Jul. 2001, pp. 782-785 (with English Abstract).
T. Berger, et al., "Lithium accumulator for high-power applications" Journal of Power Sources, vol. 136, Issue 2, Oct. 2004, pp. 383-385.
International Search Report dated Mar. 8, 2016 in PCT/JP2015/085255, filed on Dec. 16, 2015 (with English Translation of Categories of Cited Documents).
Written Opinion dated Mar. 8, 2016 in PCT/JP2015/085255, filed on Dec. 16, 2015.

* cited by examiner

*Primary Examiner* — Ladan Mohaddes
(74) *Attorney, Agent, or Firm* — Oblon, McClelland, Maier & Neustadt, L.L.P.

(57) ABSTRACT

A non-aqueous electrolyte battery includes bi-polar electrodes and non-aqueous electrolyte layers. Each electrode has a pyroelectric member and positive-pole and negative-pole active material layers on one and the other surfaces of the member. In the electrode, a position of the positive-pole layer does not overlap a position of the negative-pole layer in a thickness direction of the member. A laminated product in which the bi-polar electrodes are laminated with the electrolyte layers being interposed between the positive-pole and negative-pole active material layers on one and the other members is provided. The product has one of a first type electrode group in which the product is spirally wound and a second type electrode group in which the product is alternately bent, folded, and layered.

10 Claims, 11 Drawing Sheets

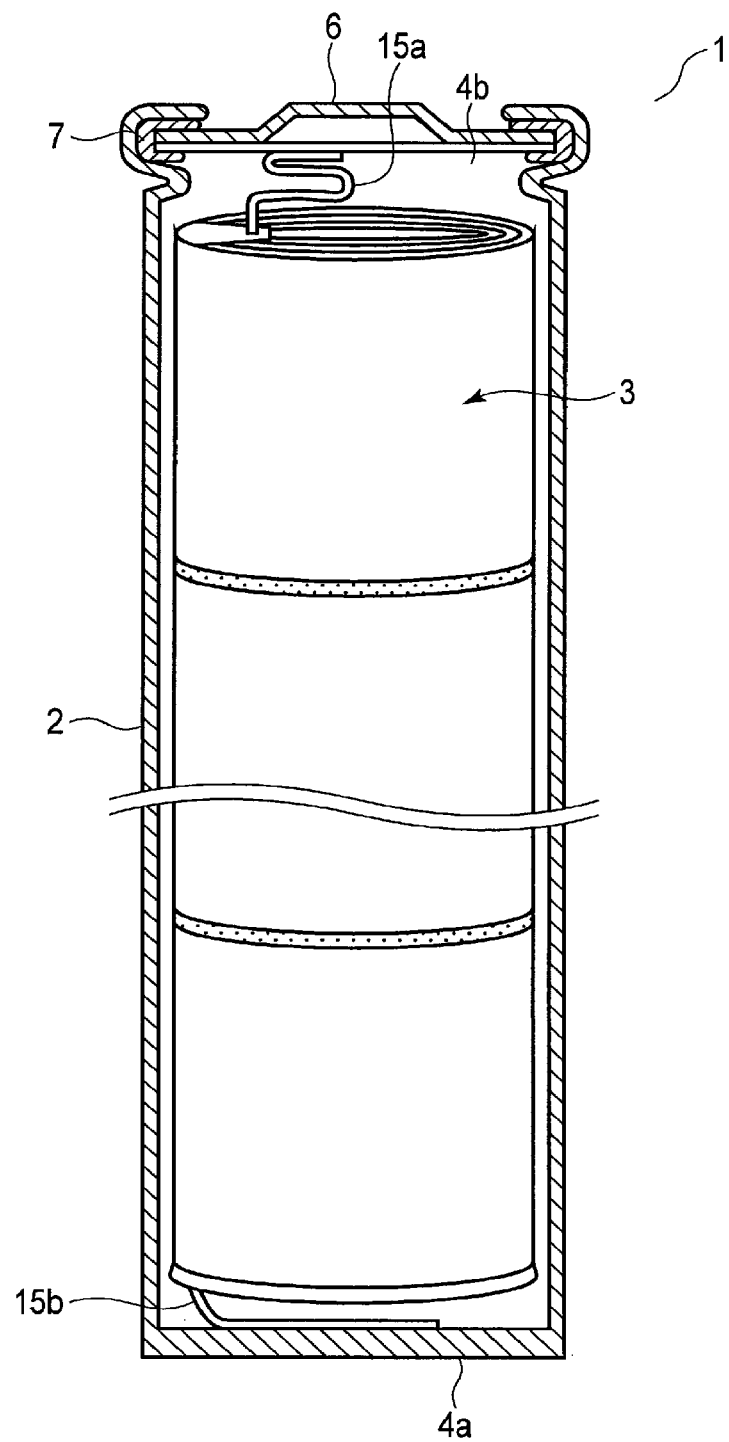
F I G. 1

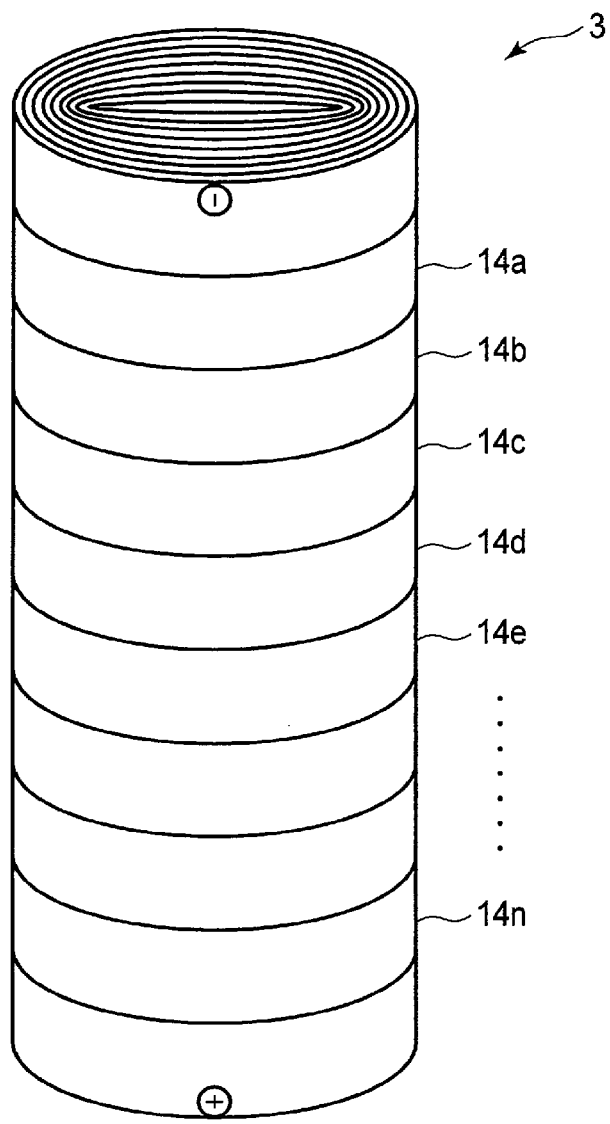
F I G. 2

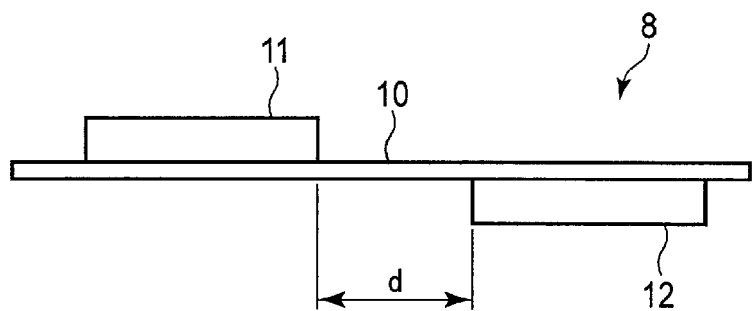
F I G. 3A
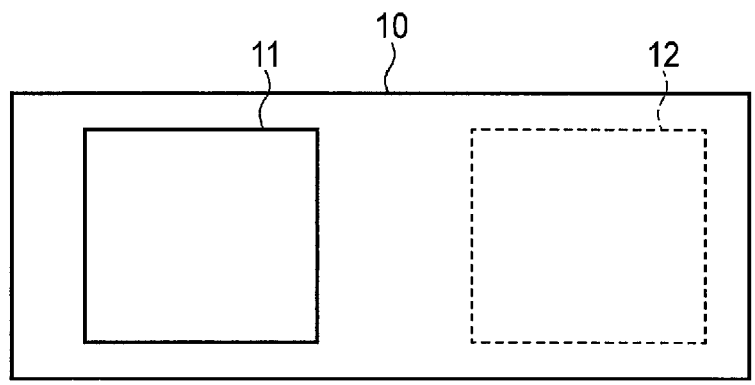
F I G. 3B
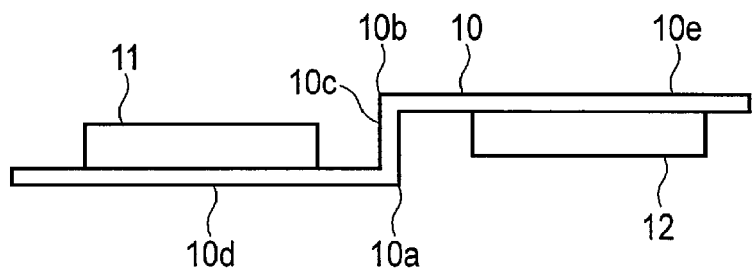
F I G. 4

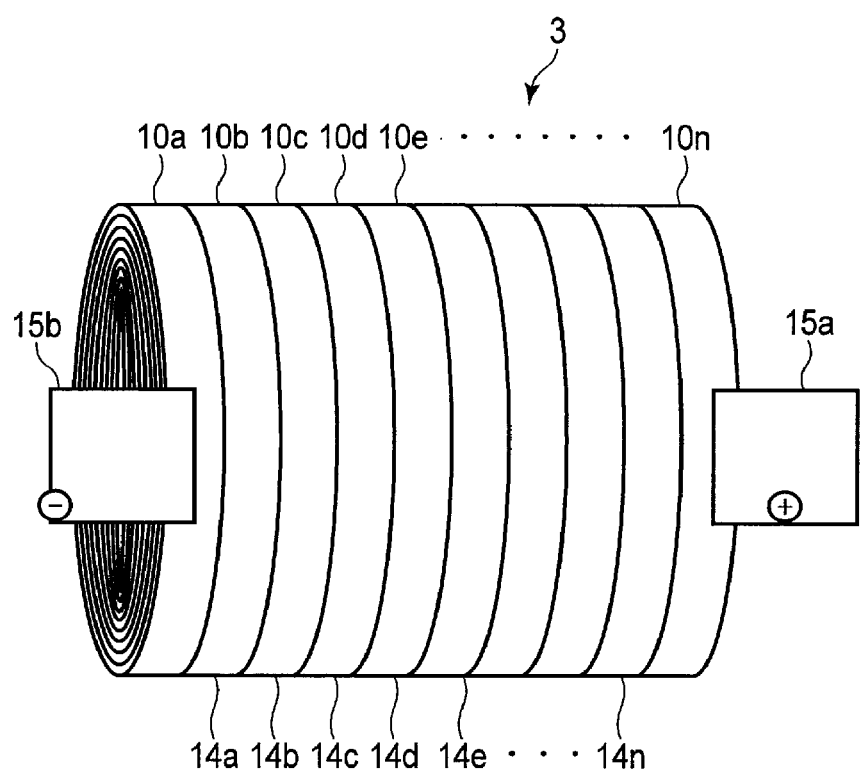
F I G. 8

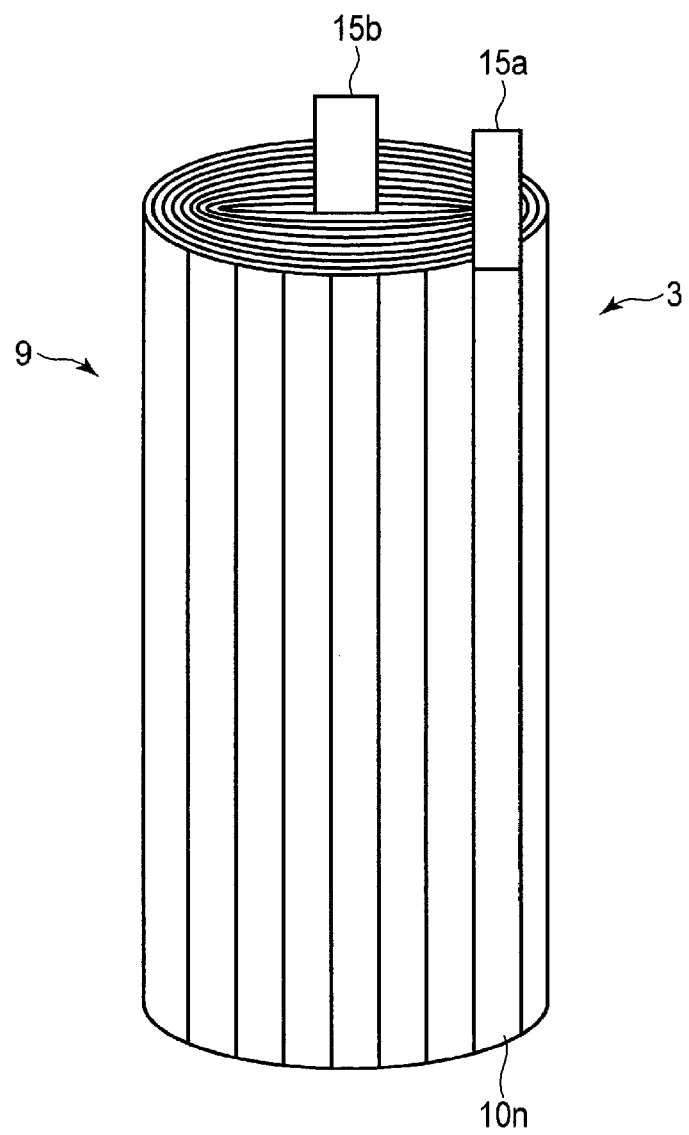
F I G. 9

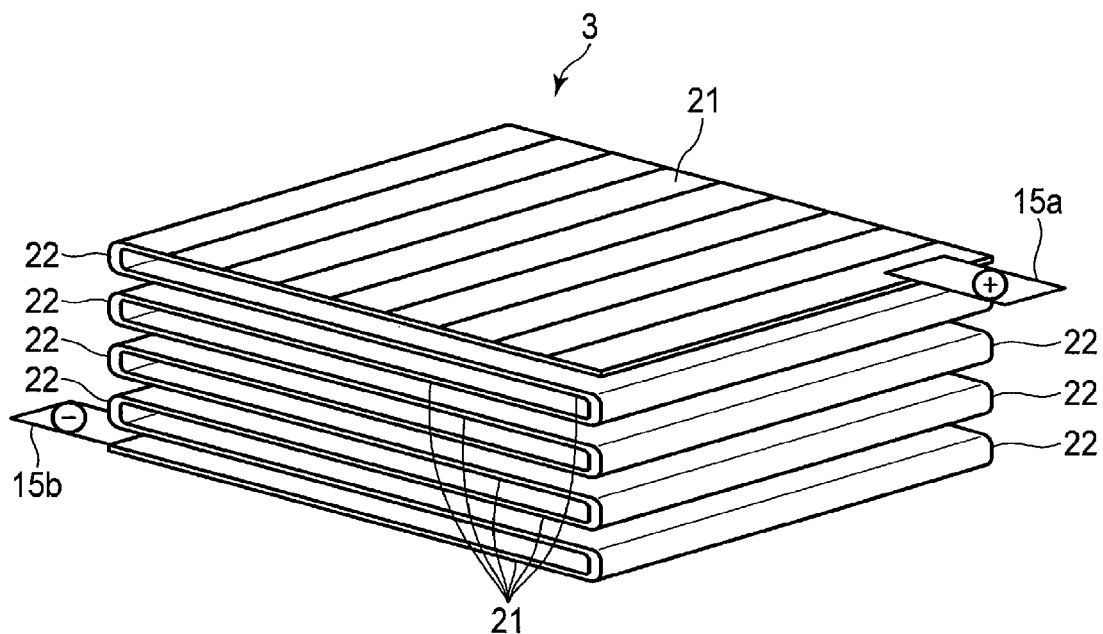
F I G. 12
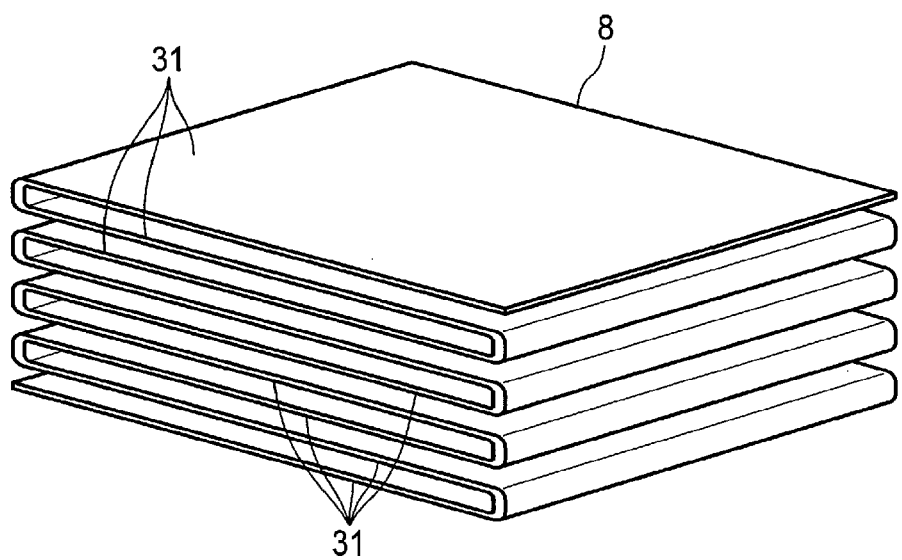
F I G. 13

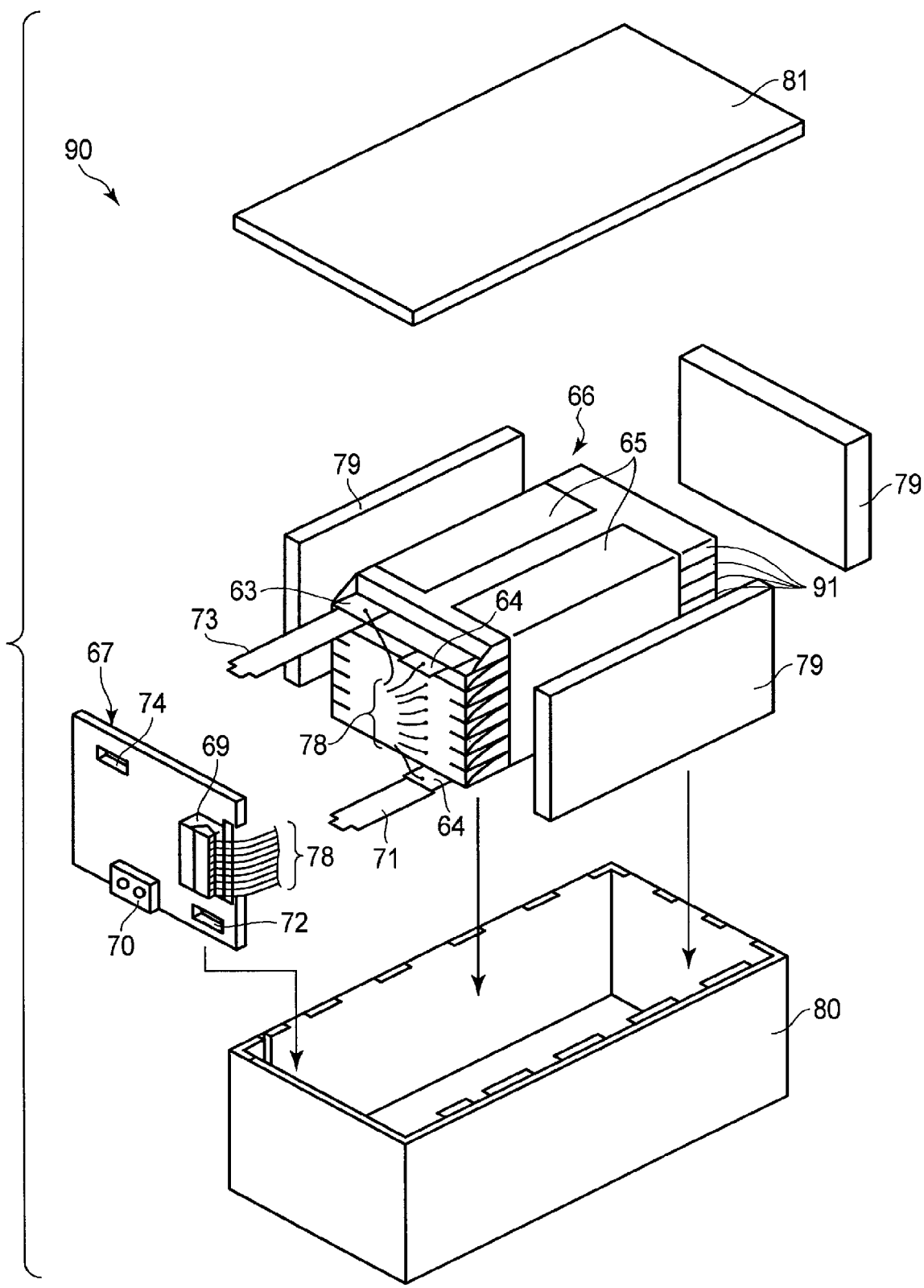
F I G. 14

NON-AQUEOUS ELECTROLYTE BATTERY AND BATTERY PACK

CROSS-REFERENCE TO RELATED APPLICATION

This is a Continuation Application of PCT Application No. PCT/JP2015/085255, filed Dec. 16, 2015, the entire contents of which are incorporated herein by reference.

FIELD

Embodiments described herein relate generally to a non-aqueous electrolyte battery and a battery pack.

BACKGROUND

Recently, research and development has been actively conducted on a non-aqueous electrolyte battery, such as a lithium-ion secondary battery, as a high energy density battery. The non-aqueous electrolyte battery is expected as a power source for a hybrid vehicle, an electric vehicle, or an uninterruptible power source of a mobile phone base station. However, even when a size of a single battery of a lithium-ion secondary battery is increased, a voltage obtained from the single battery is a low voltage of about 3.7 V. Therefore, in order to obtain a high output, it is necessary to take out a large electric current from a single battery whose size is increased. Consequently, there is a problem that a size of an entire apparatus is increased.

As a battery for solving these problems, a bi-polar battery has been proposed. The bi-polar battery is a battery having a structure in which a plurality of bi-polar electrodes are laminated in series with electrolyte layers being interposed therebetween and, in each of the bi-polar electrodes, a positive-pole active material layer is formed on one plate surface of a pyroelectric member and a negative-pole active material layer is formed on the other plate surface thereof. In this bi-polar battery, since the bi-polar electrodes are laminated in series within the single battery, a high voltage can be obtained in the single battery. Therefore, even when a high output is obtained, an output of a high voltage and constant current can be obtained. Furthermore, an electrical resistance of a battery connecting portion can be significantly reduced.

In the lithium-ion secondary battery, a structure using a liquid electrolyte is employed. However, in the bi-polar battery, since positive electrodes and negative electrodes are repeated in the single battery, the structure of the lithium-ion secondary battery using the liquid electrolyte cannot be applied to the bi-polar battery. That is, due to the structure of the bi-polar battery, it is necessary to take a structure in which electrodes are independently separated from one another, so as to prevent a short circuit (liquid junction) caused by ion conduction when electrolytes existing between electrode layers touch each other.

In the past, a bi-polar battery using a high polymer solid electrolyte including no liquid electrolyte has been proposed. In a case where this method is used, since the liquid electrolyte is not included in the battery, a possibility of a short circuit (liquid junction) caused by ion conduction between electrode layers is reduced. However, in general, an ion conductivity of the solid electrolyte is very low, for example, about $\frac{1}{10}$ to about $\frac{1}{100}$ of an ion conductivity of the liquid electrolyte. Due to this, a problem that the output density of the battery is reduced occurs, and thus, it has not been put to practice use.

In consideration of these circumstances, a bi-polar battery using a gel electrolyte obtained by semi-solidifying a liquid electrolyte is proposed. The gel electrolyte is a gel-like electrolyte in which an electrolyte solution is penetrated into a high polymer such as polyethylene oxide (PEO) or polyvinylidene fluoride (PVdF). The gel electrolyte is expected to obtain high ion conductivity and sufficient output density of a battery.

A problem remains to achieve an increase in a size of a bi-polar battery (high energy density). As a method for high energy density of a bi-polar battery, a method of increasing electrode areas of positive and negative electrodes and a method of connecting small-area bi-polar type single batteries in parallel to one another may be taken into consideration.

A lithium-ion secondary battery having a conventional electrode structure achieves high energy density by spirally winding positive and negative electrodes and a separator without a gap therebetween and filling the spirally winding into a battery outer case at a high density. However, since the positive electrode and the negative electrode are integrally formed in a structure of the bi-polar battery, counter electrodes are in contact with each other by the spiral winding. Therefore, there is a problem that a short circuit occurs if an insulating layer such as a separator or a polymer is not interposed between the bi-polar electrodes.

BRIEF DESCRIPTION OF THE DRAWINGS

FIG. 1 is a sectional perspective view showing a schematic structure of a non-aqueous electrolyte battery of a first embodiment.

FIG. 2 is a perspective view showing a schematic structure of an entire electrode group of the non-aqueous electrolyte battery of the first embodiment.

FIG. 3A is a side view showing a schematic structure of a unit element of a bi-polar electrode.

FIG. 3B is a plan view of the unit element of the bi-polar electrode of FIG. 3A.

FIG. 4 is a side view showing a bent state of a pyroelectric member of the bi-polar electrode.

FIG. 8 is a perspective view showing attachment states of pyroelectric tabs of the non-aqueous electrolyte battery of the first embodiment.

FIG. 9 is a perspective view showing a schematic structure of a laminated product of bi-polar electrodes of a non-aqueous electrolyte battery of a second embodiment.

FIG. 12 is a perspective view showing a schematic structure of a laminated product of bi-polar electrodes of a non-aqueous electrolyte battery of a fourth embodiment.

FIG. 13 is a perspective view showing a schematic structure of an electrode group of one bi-polar electrode of a non-aqueous electrolyte battery of a fifth embodiment.

FIG. 14 is an exploded perspective view showing a schematic structure of a battery pack of the non-aqueous electrolyte battery of the first embodiment.

DETAILED DESCRIPTION

Figure 5:
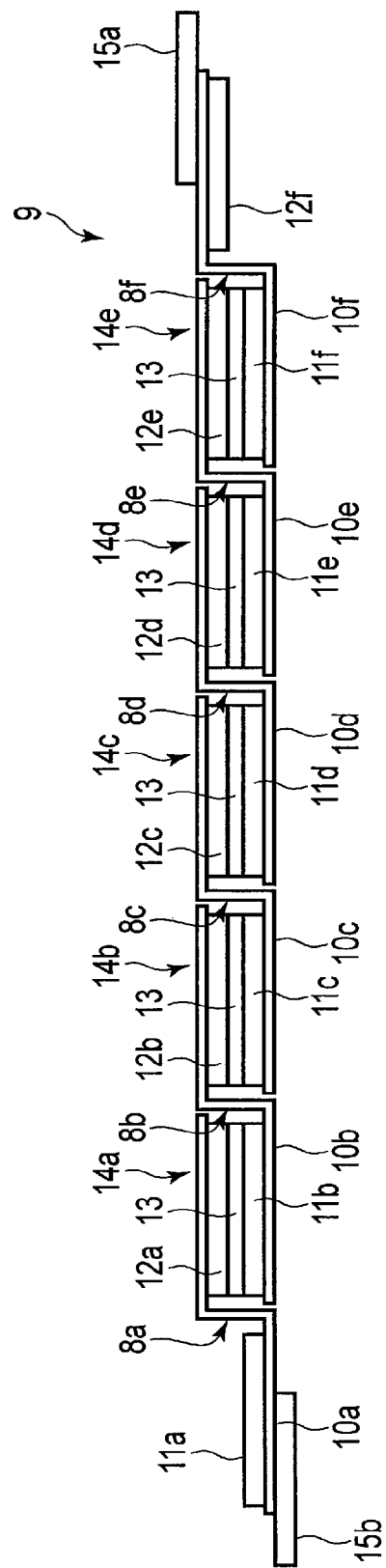
FIG. 5 is a side view of a laminated product of the bi-polar electrodes.

According to one embodiment, a non-aqueous electrolyte battery includes bi-polar electrodes each having a pyroelectric member, a positive-pole active material layer formed on one surface of the pyroelectric member and a negative-pole active material layer formed on the other surface of the pyroelectric member. The non-aqueous electrolyte battery further includes non-aqueous electrolyte layers each isolating the positive-pole active material layer of one bi-polar electrode from the negative-pole active material layer of the other bi-polar electrode. In the bi-polar electrode, a position of the positive-pole active material layer does not overlap a position of the negative-pole active material layer in a thickness direction of the pyroelectric member. A laminated product in which the bi-polar electrodes are laminated with the non-aqueous electrolyte layers being interposed therebetween is provided. In the laminated product, the bi-polar electrodes are laminated sequentially in a state that one of the positive-pole active material layer and the negative-pole active material layer of one bi-polar electrode and the other of the positive-pole active material layer and the negative-pole active material layer of the other bi-polar electrode adjacent to the one bi-polar electrode in a laminating direction are arranged to face each other. And, the laminated product is one of a first type in which the laminated product is spirally wound and a second type in which the laminated product is divided into a plurality of parts with a predetermined length in one direction and the divided parts are sequentially and alternately bent, folded, and layered.

Hereinafter, non-aqueous electrolyte batteries of various embodiments and a battery pack according to a first embodiment will be described with reference to the drawings. It should be noted that the same reference numeral designates the common element throughout the embodiments and redundant descriptions will be omitted. Furthermore, drawings are schematic diagrams for promoting explanations of the embodiments and the understandings thereof. And, although their shapes, dimensions, ratios and the like are differences from those of an actual one, their designs can be appropriately modified with reference to the following descriptions and known technologies.

First Embodiment

FIGS. 1 to 8 show a first embodiment. FIG. 1 is a sectional perspective view showing a schematic structure of a non-aqueous electrolyte battery 1 of one example according to the first embodiment. The non-aqueous electrolyte battery 1 shown in FIG. 1 includes an outer case 2 of a substantially cylindrical shape and a first type electrode group 3 in which a laminated product 9 of bi-polar electrodes 8 to be described below is spirally wound. The outer case 2 is formed of, for example, a laminate film in which a metal layer is interposed between two sheets of resin films. The first type electrode group 3 of the laminated product 9 of the bi-polar electrodes 8 is stored in the outer case 2.

The outer case 2 of the present embodiment includes a bottomed cylindrical case body 5 in which a bottom end 4a of a cylindrical member 4 is closed, and a disk-shaped cap 6 which closes an upper open end 4b of the cylindrical member 4 in FIG. 1. The cap 6 seals the upper open end 4b in a hermetically closed state through a sealing member 7.

FIG. 2 is a perspective view showing a schematic structure of the entire electrode group 3 of the non-aqueous electrolyte battery 1 of the present embodiment. The electrode group 3 of the present embodiment is structured by laminating a plurality of bi-polar electrodes 8 as follows.

FIGS. 3A and 3B show a basic structure of a unit element of the bi-polar electrode 8. The bi-polar electrode 8 includes a pyroelectric member 10 of a rectangular flat plate shape, a positive-pole active material layer 11 formed on one surface (front surface) of the pyroelectric member 10 and a negative-pole active material layer 12 formed on the other surface (rear surface) of the pyroelectric member 10. Here, the positive-pole active material layer 11 and the negative-pole active material layer 12 are arranged at laterally shifted positions on both sides of the pyroelectric member 10 so as not to overlap each other in a thickness direction of the pyroelectric member 10 with the pyroelectric member 10 being interposed therebetween. That is, in FIGS. 3A and 3B, the positive-pole active material layer 11 is arranged on the front surface of the pyroelectric member 10 at a position shifted in a left side from a central position in its longitudinal direction. The negative-pole active material layer 12 is arranged on the rear surface of the pyroelectric member 10 at a position shifted in a right side from the central position in the longitudinal direction. A space of a distance "d" is produced between the positive-pole active material layer 11 and the negative-pole active material layer 12 in the longitudinal direction of the pyroelectric member 10.

Aluminum is used as a material of the pyroelectric member 10 and is formed in a rectangular flat plate shape. Lithium manganese phosphate (hereinafter referred to as LMP) is used in the positive-pole active material layer 11, and lithium titanate (hereinafter referred to as LTO) is used in the negative-pole active material layer 12. The positive-pole active material layer 11 can insert and extract lithium. In the negative-pole active material layer 12, a reaction potential exists around about 1.5 V. In each of the LMP and the LTO, 5 wt % of carbon and 10 wt % of polyvinylidene fluoride with respect to a total weight of the bi-polar electrode 8 are mixed as a conductive assistant material and a biding material. By shaping such a mixture as described above, the unit element of the bi-polar electrode 8 shown in FIGS. 3A and 3B is prepared.

FIG. 4 is a side view showing a bent state in which the pyroelectric member 10 of the unit element of the bi-polar electrode 8 of FIGS. 3A and 3B is bent in a step-like shape. Here, as shown in FIG. 4, a first bent portion 10a bent upwardly, a second bent portion 10b bent horizontally and a rising plate portion 10c between the first bent portion 10a and the second bent portion 10b are formed at a central position of the pyroelectric member 10 in its longitudinal direction. Further, a first lay-down plate portion 10d is arranged at and connected to a lower end of the rising plate portion 10c through the first bent portion 10a, and a second lay-down plate portion 10e is arranged at and connected to an upper end of the rising plate portion 10c through the second bent portion 10b. The positive-pole active material layer 11 is arranged on the upper surface of the first lay-down plate portion 10d and the negative-pole active material layer 12 is arranged on the lower surface of the second lay-down plate portion 10e.

FIG. 5 is a side view of a laminated product 9 of the bi-polar electrodes 8 in which the unit elements of the bi-polar electrodes 8 of FIG. 4 are laminated in multiple stages (six stages in the present embodiment) and are connected in series to each other. In the laminated product 9 of the present embodiment, the unit element of the bi-polar electrode 8 of a first stage is referred to as a first unit element 8a. Similarly, the unit elements of the bi-polar electrodes 8 of a second stage, a third stage, a fourth stage, a fifth stage and a sixth stage are respectively referred to as a second unit element 8b, a third unit element 8c, a fourth unit element 8d, a fifth unit element 8e and a sixth unit element 8f. Furthermore, the same components of the respective unit elements 8a to 8f are denoted by the same suffixes.

In the laminated product 9, one of the positive-pole active material layer 11 and the negative-pole active material layer 12 of the unit element of one bi-polar electrode 8 and the other of the positive-pole active material layer 11 and the negative-pole active material layer 12 of the unit element of the other bi-polar electrode 8 adjacent to the unit element of the one bi-polar electrode 8 in a laminating direction are sequentially laminated in a state that the one active material layer and the other active material layer are arranged to face each other.

In FIG. 5, the negative-pole active material layer 12a of the unit element 8a of the first stage and the positive-pole active material layer 11b of the unit element 8b of the second stage adjacent to the unit element 8a of the first stage in the laminating direction of the laminated product 9 are laminated in a state that the negative-pole active material layer 12a of the unit element 8a and the positive-pole active material layer 11b of the unit element 8b are arranged to face each other. Further, a non-aqueous electrolyte layer (separator) 13 is inserted between the negative-pole active material layer 12a and the positive-pole active material layer 11b so as to separate the positive-pole active material layer 11b from the negative-pole active material layer 12a. Thereby, a first battery cell 14a is formed.

Figure 6:
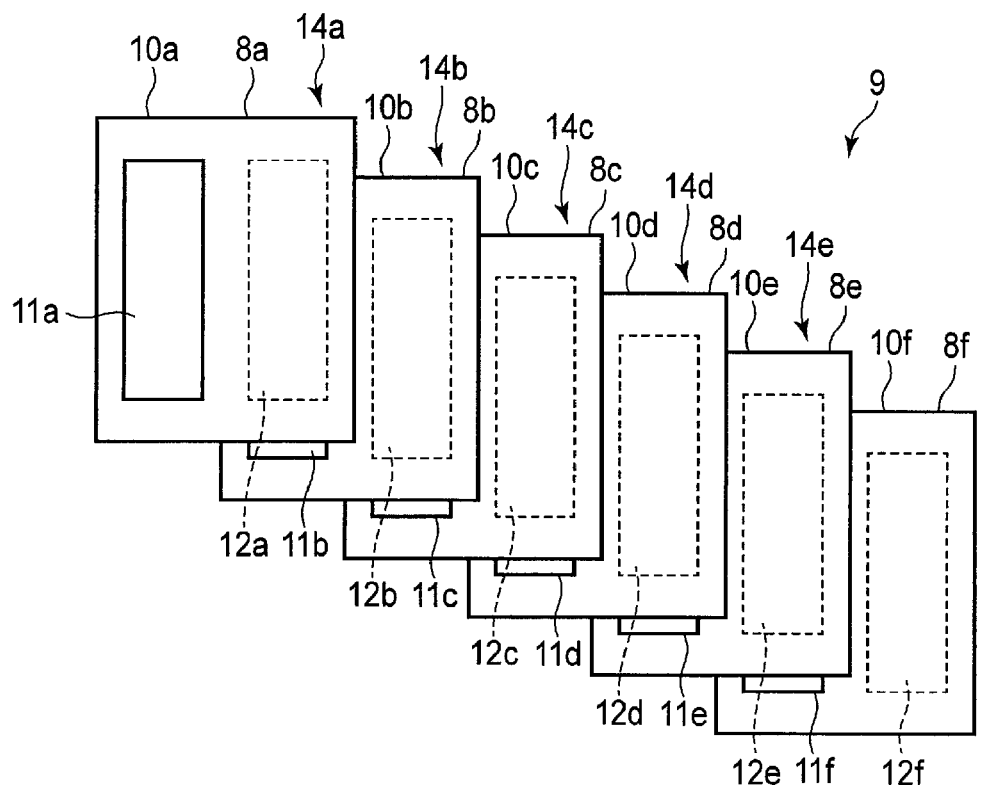
FIG. 6 is a plan view for explaining a laminated state of the laminated product of the bi-polar electrodes.

A laminated state between the unit element 8b of the second stage of the bi-polar electrode 8 and the unit element 8c of the third stage adjacent to the unit element 8b of the second stage in the laminating direction of the laminated product 9 is also the same as the laminated state between the unit element 8a of the first stage and the unit element 8b of the second stage. Further, a laminated state between two adjacent unit elements 8 in the subsequent stages is also the same as the laminated state between the unit element 8a of the first stage and the unit element 8b of the second stage. In this way, as schematically shown in FIG. 6, the laminated product 9 of the bi-polar electrodes 8 in which six unit elements 8a to 8f are sequentially laminated in six stages is formed. A non-aqueous electrolyte layer (separator) 13 is inserted between a negative-pole active material layer 12b of the unit element 8b of the second stage and a positive-pole active material layer 11c of the unit element 8c of the third stage. Thereby, a second battery cell 14b is formed.

Similarly, a non-aqueous electrolyte layer (separator) 13 is inserted between a negative-pole active material layer 12c of the unit element 8c of the third stage and a positive-pole active material layer 11d of the unit element 8d of the fourth stage. Thereby, a third battery cell 14c is formed. Further, a non-aqueous electrolyte layer (separator) 13 is inserted between a negative-pole active material layer 12d of the unit element 8d of the fourth stage and a positive-pole active material layer 11e of the unit element 8e of the fifth stage. Thereby, a fourth battery cell 14d is formed. Furthermore, a non-aqueous electrolyte layer (separator) 13 is inserted between a negative-pole active material layer 12e of the unit element 8e of the fifth stage and a positive-pole active material layer 11f of the unit element 8f of the sixth stage. Thereby, a fifth battery cell 14e is formed.

It should be noted that, in FIG. 6, the six unit elements 8a to 8f are shifted in a vertical direction for ease of understanding, but in actuality, upper end positions of the six unit elements 8a to 8f in FIG. 6 are arranged on the same one plane and lower end positions of the six unit elements 8a to 8f in FIG. 6 are arranged on the same another plane. Furthermore, in FIG. 5, a vertical direction is referred to as a laminating direction of the laminated product 9, and light and left directions are referred to as battery cell side-by-side directions perpendicular to the laminating direction of the laminated product 9.

Figure 7:
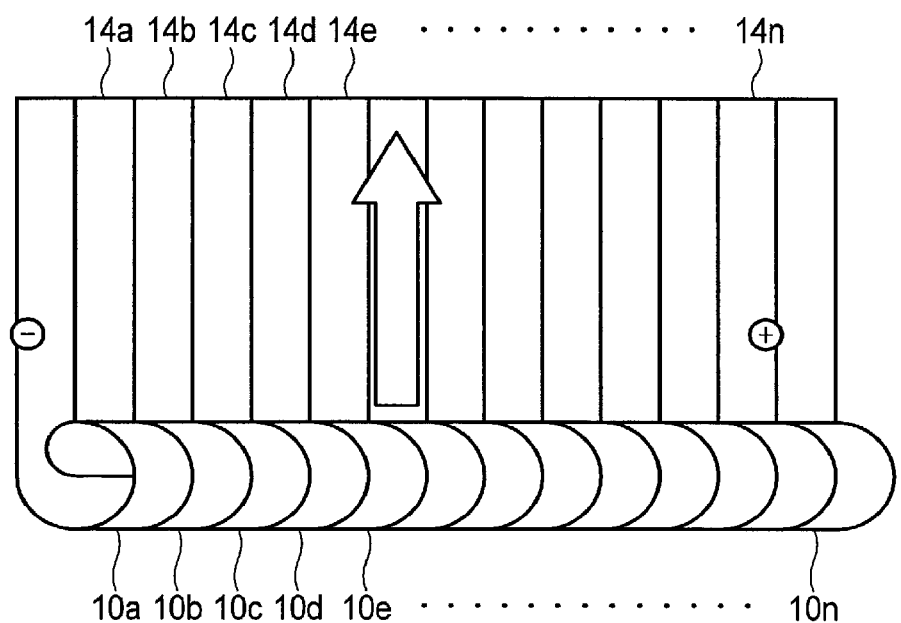
FIG. 7 is a schematic structural view for explaining a first type winding state in which a laminated product of bi-polar electrodes is spirally wound.

In the present embodiment, the first type electrode group 3 of the bi-polar electrodes 8 is structured by spirally winding the above-described laminated product 9 in the laminating direction of the laminated product 9 as shown in FIG. 7. FIG. 7 shows the laminated product 9 in which the unit elements of the bi-polar electrodes 8 are laminated in "n" stages (here, 13 stages).

Furthermore, FIG. 8 is a perspective view showing attachment states of pyroelectric tabs 15a and 15b of the electrode group 3 of the non-aqueous electrolyte battery 1 of the first embodiment. Here, as shown in FIG. 8, a pyroelectric tab 15a for a positive electrode is formed on an outer peripheral surface of one end of the electrode group 3 (on a right end in FIG. 8). Further, a pyroelectric tab 15b for a negative electrode is formed on the other end of the electrode group 3 (a left end in FIG. 8). These pyroelectric tabs 15a and 15b protrude in parallel to an axial direction of a central axis of a spiral of the electrode group 3. The protruding direction of the pyroelectric tabs 15a and 15b is not limited thereto, and for example, the pyroelectric tabs 15a and 15b may protrude in a tangential direction of the outer peripheral surface of the electrode group 3 (in a direction perpendicular to the axial direction of the central axis of the spiral of the electrode group 3).

As shown in FIG. 1, in the non-aqueous electrolyte battery 1 according to the first embodiment, the first type electrode group 3 of the bi-polar electrodes 8 having the spiral structure is housed in the outer case 2. An insulating member such as, for example a non-woven fabric or a resin material is arranged on an inner peripheral surface of the outer case 2.

In the vicinity of one end of an outer peripheral surface of the electrode group 3 of the bi-polar electrodes 8, the pyroelectric tab 15a for the positive electrode is connected to a part of the pyroelectric member 10 on which the positive-pole active material layer 11 is laminated, and the pyroelectric tab 15b for the negative electrode is connected to a part of the pyroelectric member 10 on which the negative-pole active material layer 12 is laminated. The pyroelectric tab 15b for the negative electrode and the pyroelectric tab 15a for the positive electrode extend outward from openings (not illustrated) of the outer case 2 and are respectively connected to a negative electrode terminal and a positive electrode terminal. The openings of the outer case 2 for the pyroelectric tab 15b of the negative electrode and the pyroelectric tab 15a of the positive electrode are heat sealed while the pyroelectric tab 15b and the pyroelectric tab 15a are passed through the openings, so that the bi-polar electrodes 8 and the non-aqueous electrolytes are completely sealed in the outer case 2.

Next, the non-aqueous electrolyte battery 1 according to the first embodiment will be described in more detail. The electrode group can hold the non-aqueous electrolyte. The non-aqueous electrolyte, together with the electrode group, can be housed in the outer case 2.

The non-aqueous electrolyte battery 1 according to the first embodiment can prevent the non-aqueous electrolyte from leaking through openings provided in lead clamping portions, that is, from leaking from the inside of the battery to the outside of the battery. In particular, in the non-aqueous electrolyte battery 1 according to the first embodiment, when an electrode lead is heat-sealed to a periphery of the opening provided in the lead clamping portion, the heat seal exhibits high sealing performance. Accordingly, it is possible to further prevent the non-aqueous electrolyte from leaking from the inside of the battery 1 to the outside of the battery 1. The electrode group 3 may include positive electrodes and negative electrodes. Moreover, the electrode group 3 can also include separators interposed between the positive electrodes and the negative electrodes.

The positive electrode can include a positive electrode pyroelectric member and a positive electrode material layer formed on the positive electrode pyroelectric member. The positive electrode material layer may be formed on both surfaces of the positive electrode pyroelectric member or may be formed on only one surface of the positive electrode pyroelectric member. The positive electrode pyroelectric member may include a positive electrode material layer non-supporting portion in which the positive electrode material layer is not formed on any surface of the positive electrode pyroelectric member.

The positive electrode material layer can include a positive-pole active material. The positive electrode material layer can include a conductive agent and a binding material. The conductive agent may be compounded to increase pyroelectric performance and to reduce a contact resistance between the positive-pole active material and the positive electrode pyroelectric member. The binding material can be compounded to fill gaps between the dispersed positive-pole active materials and to bind the positive-pole active material with the positive electrode pyroelectric member.

The positive electrode can be connected to an electrode lead, that is a positive electrode lead, for example through the positive electrode material layer non-supporting portion of the positive electrode pyroelectric member. A connection between the positive electrode and the positive electrode lead can be performed by, for example welding.

The negative electrode can include a negative electrode pyroelectric member and a negative electrode material layer formed on the negative electrode pyroelectric member. The negative electrode material layer may be formed on both surfaces of the negative electrode pyroelectric member or may be formed on only one surface of the negative electrode pyroelectric member. The negative electrode pyroelectric member may include a negative electrode material layer non-supporting portion in which the negative electrode material layer is not formed on any surface of the negative electrode pyroelectric member.

The negative electrode material layer can include a negative-pole active material. The negative electrode material layer can include a conductive agent and a binding material. The conductive agent may be compounded to increase pyroelectric performance and to reduce a contact resistance between the negative-pole active material and the negative electrode pyroelectric member. The binding material can be compounded to fill gaps between the dispersed negative-pole active materials and to bind the negative-pole active material with the negative electrode pyroelectric member.

The negative electrode can be connected to an electrode lead, that is a negative electrode lead, for example through the negative electrode material layer non-supporting portion of the negative electrode pyroelectric member. The connection between the negative electrode and the negative electrode lead can be performed by, for example welding.

Hereinafter, members and materials which can be used in the non-aqueous electrolyte battery according to the first embodiment will be described.

[1] Negative Electrode

The negative electrode can be manufactured, for example by coating a negative electrode agent paste on one surface or both surfaces of the negative electrode pyroelectric member and by drying the negative electrode agent paste. The negative electrode agent paste can be obtained by appropriately dispersing a negative-pole active material, a conductive agent and a binding material in a solvent. After the drying, the negative electrode agent paste can be pressed.

As the negative-pole material, a carbonaceous material, a metal oxide, a metal sulfide, a metal nitride, an alloy, a light metal or the like, which is capable of inserting and extracting lithium ion, may be used.

As the carbonaceous material capable of inserting and extracting lithium ion, for example a coke, a carbon fiber, a pyrolytic gaseous carbon material, a graphite, a resin sintered body, a sintered body of a mesophase pitch-based carbon fiber or of mesophase spherical carbon, or the like may be used. Among them, it is preferable to use the mesophase pitch-based carbon fiber or the mesophase spherical carbon graphitized at 2,500° C. or more because the mesophase pitch-based carbon fiber or the mesophase spherical carbon can increase an electrode capacity.

As the metal oxides, for example a titanium-containing metal composite oxide, a tin-based oxide such as, for example $SnB_{0.4}P_{0.6}O_{3.1}$ or $SnSiO_3$, a silicon-based oxide such as, for example SiO, or a tungsten-based oxide such as, for example $WO_3$ may be used. Among these metal oxides, it is preferable to use a negative-pole active material whose electric potential is higher than 0.5 V with respect to metallic lithium, for example a titanium-containing metal composite oxide such as a lithium titanate because, even when the battery is rapidly charged, it is possible to suppress an occurrence of lithium dendrite on the negative electrode and then to suppress degradation of the battery.

As the titanium-containing metal composite oxides, a titanium-based oxide which does not contain lithium at the time of oxide synthesis, a lithium titanium oxide, a lithium titanium composite oxide obtained by substituting some constituent elements of the lithium titanium oxide with at least one different element selected from a group consisting of, for example Nb, Mo, W, P, V, Sn, Cu, Ni and Fe, or the like may be used.

As the lithium titanium oxides, a lithium titanate having a spinel structure (for example, $Li_{4+x}Ti_5O_{12}$ (x can vary within a range of $0 \leq x \leq 3$ by charging and discharging)), a titanium oxide having a bronze structure (B) or an anatase structure (for example, $Li_xTiO_2$ ($0 \leq x \leq 1$) and a composition prior to charging is $TiO_2$), a niobium titanium oxides (for example, $Li_xNb_aTiO_7$ ($0 \leq x$, more preferably $0 \leq x \leq 1$ and $1 \leq a \leq 4$) represented by a Ramsdellite type lithium titanate (for example, $Li_{2+y}Ti_3O_7$ (y can vary within a range of $0 \leq y \leq 3$ by charging and discharging) or the like may be used.

As the titanium-based oxides, $TiO_2$, a metal composite oxide containing Ti and at least one element selected from a group consisting of P, V, Sn, Cu, Ni, Co and Fe or the like may be used. $TiO_2$ is preferably an anatase type which has low crystallinity with a heat treatment temperature in a range of 300° C. to 500° C. As the metal composite oxide containing Ti and at least one element selected from the group consisting of P, V, Sn, Cu, Ni, Co and Fe, for example $TiO_2$—$P_2O_5$, $TiO_2$—$V_2O_5$, $TiO_2$—$P_2O_5$—$SnO_2$ $TiO_2$—

$P_2O_5$-MeO (Me is at least one element selected from a group consisting of Cu, Ni, Co and Fe) or the like may be used. It is preferable that the metal composite oxide as described above has a microstructure in which a crystalline phase and an amorphous phase coexist or an amorphous phase alone exists. Such a microstructure as described above can considerably improve cycle performance. Among them, a lithium titanium oxide and the metal composite oxide containing Ti and at least one element selected from the group consisting of P, V, Sn, Cu, Ni, Co and Fe are preferable.

As the metal sulfides, a lithium sulfide ($TiS_2$), a molybdenum sulfide ($MoS_2$), an iron sulfide (FeS, $FeS_2$, $Li_xFeS_2$ (where 0<x≤1) or the like may be used. As the metal nitride, a lithium cobalt nitride ($Li_xCo_yN$ (where 0<x<4 and 0<y<0.5)) or the like may be used.

As the negative-pole active material, a lithium titanate having a spinel structure is preferably used.

As the conductive agent, a carbon material can be used. As the carbon material, an acetylene black, a carbon black, a coke, a carbon fiber, a graphite or the like may be used.

As the binding material, for example, a polytetrafluoroethylene (PTFE), a polyvinylidene fluoride (PVdF), an ethylene-propylene-diene copolymer (EPDM), a styrene-butadiene rubber (SBR), a carboxymethyl cellulose (CMC) or the like can be used.

As the negative electrode pyroelectric member, various metal foils or the like can be used according to a negative electrode potential, and for example an aluminum foil, an aluminum alloy foil, a stainless steel foil, a titanium foil, a copper foil, a nickel foil or the like may be used. A thickness of the foil is preferably in a range of 8 µm or more to 25 µm or less. In a case where the negative electrode potential is higher than 0.3 V with respect to the metal lithium and, for example the lithium titanium oxide is used as the negative-pole active material, the aluminum foil or the aluminum alloy foil is preferably used because it can reduce a battery weight.

It is preferable that an average crystal grain size of each of the aluminum foil and the aluminum alloy foil is 50 µm or less. This can drastically increase the strength of the negative electrode pyroelectric member so that the negative electrode can be pressed by a high pressure to have a high density and a battery capacity can be increased. Further, since it is possible to prevent dissolution and corrosion degradation of the negative electrode pyroelectric member in an overdischarge cycle under a high temperature environment (40° C. or more), it is possible to suppress an increase in an impedance of the negative electrode. Furthermore, it is also possible to improve output characteristics, quick charge, and charge and discharge cycle characteristics. A more preferable range of the average crystal grain size is 30 µm or less and a still more preferable range of the average crystal grain size is 5 µm or less.

The average crystal grain size can be obtained as follows. A structure of a surface of the pyroelectric member is observed under an optical microscope and the number "n" of crystal grains existing in 1 mm×1 mm is obtained. By using this "n", an average crystal grain area S is obtained from $S=1\times10^{6/n}$ (µm²). The average crystal grain size "d" (µm) can be calculated from the obtained value of S by Formula (A) below:

$$d=2(S/\pi)^{1/2} \quad (A)$$

In a case that an range of an average crystal grain size of each of the aluminum foil and the aluminum alloy foil is 50 µm or less, the crystal grain size (diameter) is complicatedly affected by a lot of factors, such as a material composition, an impurity, a processing condition, a heat treatment history, a heating condition of an annealing and the like. Therefor, the above crystal grain size (diameter) is adjusted by combining the factors in a manufacturing process.

A thickness of each of the aluminum foil and the aluminum alloy foil is preferably 20 µm or less and is more preferably 15 µm or less. A purity of the aluminum foil is preferably 99% or more. The aluminum alloy is preferable to include at least one element of magnesium, zinc, silicon and the like. On the other hand, a content of a transition metal such as an iron, a copper, a nickel, a chromium or the like is preferably 1% or less. In a case that the battery is for an automobile, the use of the aluminum alloy foil is particularly preferable.

A compounding ratio of the negative-pole active material, the conductive agent and the binding material is preferably in a range of 80 to 95 wt % of the negative-pole active material, 3 to 20 wt % of the conductive agent and 1.5 to 7 wt % of the binding material.

[2] Positive Electrode

The positive electrode can be manufactured, for example, by coating a positive electrode agent paste on one surface or both surfaces of the positive electrode pyroelectric member and by drying the positive electrode agent paste. The positive electrode agent paste can be obtained by appropriately dispersing a positive-pole active material, a conductive agent and a binding material in a solvent. After the drying, the positive electrode agent paste can be pressed.

As the positive-pole active material, various oxides, sulfides or the like may be used. As the positive-pole active material, a manganese dioxide ($MnO_2$), an iron oxide, a copper oxide, a nickel oxide, a lithium manganese composite oxide (for example $Li_xMn_2O_4$ or $Li_xMnO_2$ (where 0≤x≤1.2)), a lithium nickel composite oxide (for example, $Li_xNiO_2$ (where 0≤x≤1.2)), a lithium cobalt composite oxide ($Li_xCoO_2$ (where 0≤x≤1.2)), a lithium nickel cobalt composite oxide (for example, $LiNi_{1-y}Co_yO_2$ (where 0<y≤1)), a lithium manganese cobalt composite oxide (for example, $LiMn_yCo_{1-y}O_2$ (where 0<y≤1)), a spinel-type lithium manganese nickel composite oxide ($Li_xMn_{2-y}Ni_yO_4$ (where 0≤x≤1.2 and 0<y≤1)), a lithium phosphorus oxide having an olivine structure ($Li_xFePO_4$, $Li_xFe_{1-y}Mn_yPO_4$, $Li_xMnPO_4$, $Li_xMn_{1-y}Fe_yPO_4$, $Li_xCoPO_4$ and the like (where 0≤x≤1.2 and 0<y≤1)), iron sulfate ($Fe_2(SO_4)_3$), a vanadium oxide (for example, $V_2O_5$) or the like may be used.

As the positive-pole active material, an organic material or an inorganic material may be used. And, the organic material and the inorganic material may include a conductive polymer material such as a polyaniline, a polypyrrole and the like, a disulfide-based polymer material, a sulfur (S), a carbon fluoride and the like.

Alternatively, a mixture of two or more selected from these can be used.

As the conductive agent, an acetylene black, a carbon black, an artificial graphite, a natural graphite, a conductive polymer or the like may be used.

As the binding material, for example a polytetrafluoroethylene (PTFE), a polyvinylidene fluoride (PVdF), a modified PVdF in which at least one of hydrogen or fluorine of PVdF is substituted with another substituent, a copolymer of vinylidene fluoride and hexafluoride propylene, a terpolymer of polyvinylidene fluoride, tetrafluoroethylene and hexafluoride propylene, or the like can be used.

As an organic solvent for dispersing the binding material, N-methyl-2-pyrrolidone (NMP), dimethylformamide (DMF) or the like is used.

As the positive electrode pyroelectric member, an aluminum foil, an aluminum alloy foil, a stainless steel foil, a titanium foil or the like, each having a thickness of 8 to 25 µm, may be used.

It is preferable that the positive electrode pyroelectric member is the aluminum foil or the aluminum alloy foil. And, like in the negative electrode pyroelectric member, the average crystal grain size of each of the aluminum foil and the aluminum alloy foil is preferably 50 µm or less. The average crystal grain size of each of the aluminum foil and the aluminum alloy foil is more preferably 30 µm or less and is still more preferably 5 µm or less. In a case that the average crystal grain size is 50 µm or less, a strength of each of the aluminum foil and the aluminum alloy foil can be drastically increased so that the positive electrode can be pressed at a high pressure to have a high density and a battery capacity can be increased.

In a case that an range of an average crystal grain size of each of the aluminum foil and the aluminum alloy foil is 50 µm or less, the crystal grain size (diameter) is complicatedly affected by a lot of factors, such as a material composition, an impurity, a processing condition, a heat treatment history, a heating condition of an annealing and the like. Therefor, the above crystal grain size (diameter) is adjusted by combining the factors in a manufacturing process.

A thickness of each of the aluminum foil and the aluminum alloy foil is preferably 20 µm or less and is more preferably 15 µm or less. A purity of the aluminum foil is preferably 99% or more. The aluminum alloy is preferable to include at least one element of magnesium, zinc, silicon and the like. On the other hand, a content of a transition metal such as an iron, a copper, a nickel, a chromium or the like is preferably 1% or less.

A compounding ratio of the positive-pole active material, the conductive agent and the binding material is preferably in a range of 80 to 95 wt % of the negative-pole active material, 3 to 20 wt % of the conductive agent and 1.5 to 7 wt % of the binding material.

[3] Separator

As the separator, for example a porous separator can be used. As the porous separator, for example a porous film including a polyethylene, a polypropylene, a cellulose or polyvinylidene fluoride (PVdF), a non-woven fabric made of a synthetic resin, or the like may be used. Among them, the porous film made of a polyethylene, a polypropylene or both is preferable because such a porous film as described above can easily add a shutdown function by which pores are closed to significantly attenuate charge and discharge current when a battery temperature rises. This shutdown function improves a safety of a secondary battery. From a viewpoint of a cost reduction, it is preferable to use a cellulose-based separator.

[4] Non-Aqueous Electrolyte

As the non-aqueous electrolyte, an organic electrolyte solution in which one or more lithium salts selected from $LiBF_4$, $LiPF_6$, $LiAsF_6$, $LiClO_4$, $LiCF_3SO_3$, $LiN(CF_3SO_2)_2$, $LiN(C_2F_5SO_2)_2$, $Li(CF_3SO_2)_3C$, $LiB[(OCO)_2]_2$ and the like is or are dissolved in an organic solvent in a concentration range of 0.5 to 2 mol/L, may be used.

As the organic solvent, it is preferable to use a single solvent of a cyclic carbonate such as a propylene carbonate (PC), an ethylene carbonate (EC) or the like, a chain carbonate such as a diethyl carbonate (DEC), a dimethyl carbonate (DMC), a methyl ethyl carbonate (MEC) or the like, a chain ether such as a dimethoxy ethane (DME), a diethoxy ethane (DEE) or the like, a cyclic ether such as a tetrahydrofuran (THF), a dioxolane (DOX) or the like, a γ-butyrolactone (GBL), an acetonitrile (AN), a sulfolane (SL) or the like, or a mixed solvent thereof.

Further, as the non-aqueous electrolyte, an ambient temperature molten salt containing lithium ions (ionic melt) also can be used. When an ionic melt that is composed with lithium ions, an organic cation and an anion and is liquid below 100° C., preferably below a room temperature, is selected, a secondary battery having a wide operating temperature can be obtained.

[5] Case

It is preferable that a thickness of a stainless steel member capable of being used as a case is 0.2 mm or less. For example, the stainless steel member can be structured by a composite film material in which a metal foil made of a stainless steel and an organic resin film having stiffness are laminated in this order on a thermal fusion resin film (thermoplastic resin film) arranged in the innermost layer.

As the thermal fusion resin film, for example a polyethylene (PE) film, a polypropylene (PP) film, a polypropylene-polyethylene copolymer film, an ionomer film, an ethylene vinyl acetate (EVA) film or the like can be used. And, as the organic resin film having the stiffness, for example a polyethylene terephthalate (PET) film, a nylon film or the like can be used.

The case may be structured by a case body and a cap, and the case body has a recess portion and an outer shell portion in an outside the recess portion. The recess portion can be a main portion for housing the electrode group. In this case, the case body and the cap may be an integrated member that is seamlessly continuous.

[6] Electrode Lead

As an electrode lead that can be electrically connected to the positive electrode, that is as a positive electrode lead, for example an aluminum, a titanium, alloies based on them, a stainless steel or the like can be used.

As an electrode lead that can be electrically connected to the negative electrode, that is as a negative electrode lead, for example a nickel, a copper, alloies based on them or the like can be used. In a case that a negative electrode potential is higher than 1 V with respect to a metal lithium, for example in a case that a lithium titanate is used as the negative-pole active material, each of an aluminum and an aluminum alloy can be used as a material of the negative electrode lead. In this case, it is preferable that both the positive electrode lead and the negative electrode lead use aluminium or the aluminum alloy because each of the aluminum and the aluminum is light and can reduce an electrical resistance.

From a viewpoint of mechanical properties, it is preferable that a strength of the positive electrode lead and a strength of the negative electrode lead are not high beyond a strength of the positive electrode pyroelectric member and a strength of the negative electrode pyroelectric member connected thereto, respectively, so that stress concentrations caused on connecting portions are relieved. In a case that an ultrasonic welding which is one of preferred connecting methods is applied to connect the electrode lead with the pyroelectric member, a firm welding can be easily performed when Young's modulus of each of the positive electrode lead and the negative electrode lead is small.

For example, an annealed pure aluminum (JIS1000 series) is preferable as a material of each of the positive electrode lead and the negative electrode lead.

It is preferable that a thickness of the positive electrode lead is 0.1 to 1 mm, and a more preferable range is 0.2 to 0.5 mm.

It is preferable that a thickness of the negative electrode lead is 0.1 to 1 mm, and a more preferable range is 0.2 to 0.5 mm.

The non-aqueous electrolyte battery 1 according to the first embodiment and having the above-described structure comprises the bi-polar electrode 8 and the non-aqueous electrolyte layer 13. The bi-polar electrode 8 includes the pyroelectric member 10, the positive-pole active material layer 11 on one surface of the pyroelectric member 10 and the negative-pole active material layer 12 on the other surface of the pyroelectric member 10. In the bi-polar electrode 8, the position of the positive-pole active material layer 11 is arranged not to overlap the position of the negative-pole active material layer 12 in a thickness direction of the pyroelectric member 10. And, the laminated product 9 is provided by laminating the bi-polar electrodes 8 through the non-aqueous electrolyte layers 13. In the laminated product 9, the bi-polar electrodes 8 are sequentially laminated in a state that one of the positive-pole active material layer 11 and the negative-pole active material layer 12 of one bi-polar electrode 8 and the other of the positive-pole active material layer 11 and the negative-pole active material layer 12 of the other bi-polar electrode 8 adjacent to the one bi-polar electrode 8 in a laminating direction are arranged to face each other. Further, the first type laminated product 9 in which the laminated product 9 of the bi-polar electrodes 8 is spirally wound is formed and the first type laminated product 9 is housed in the outer case 2. Therefore, due to the above described structure, it is possible to achieve high energy density and low resistance of the non-aqueous electrolyte battery 1 that is the bi-polar battery having a small volume, and it is possible to prevent liquid junction and to facilitate its fabrication.

Second Embodiment

Figure 10:
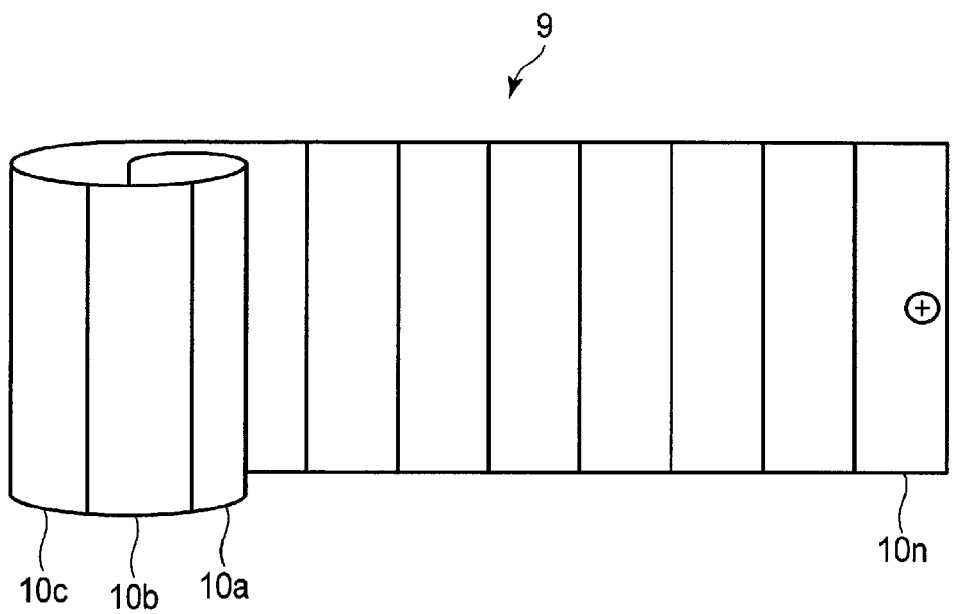
FIG. 10 is a perspective view for explaining a laminated state of a laminated product of bi-polar electrodes of the second embodiment.

FIGS. 9 and 10 show a non-aqueous electrolyte battery according to a second embodiment. In the present embodiment, the laminated product 9 of the bi-polar electrodes 8 is spirally wound in a direction different from the spirally winding direction of the first embodiment. That is, in the present embodiment, as shown in FIG. 10, the laminated product 9 is spirally wound in a battery cell side-by-side direction of the laminated product 9 (a direction perpendicular to the winding direction of the laminated product 9 of the first embodiment).

In the laminated product 9 of the bi-polar electrodes 8 of the present embodiment, a pyroelectric tab 15a for a positive electrode is formed on one end (an upper end in FIG. 9) of an outer peripheral surface of the electrode group 3. Further, a pyroelectric tab 15b for a negative electrode is formed on an upper end at a central position of the electrode group 3 in FIG. 9. These pyroelectric tabs 15a and 15b protrude in parallel to an axial direction of a central axis of a spiral of the electrode group 3.

It should be noted that the number of side-by-side arranged battery cells of the electrode group 3, an area of each battery cell or the like can be appropriately set according to a condition of use or a purpose of use.

In the non-aqueous electrolyte battery of the present embodiment, like in the non-aqueous electrolyte battery 1 of the first embodiment, it is possible to achieve high energy density and low resistance of the non-aqueous electrolyte battery 1 that is the bi-polar battery having a small volume, and it is possible to prevent liquid junction and to facilitate its fabrication.

Third Embodiment

Figure 11:
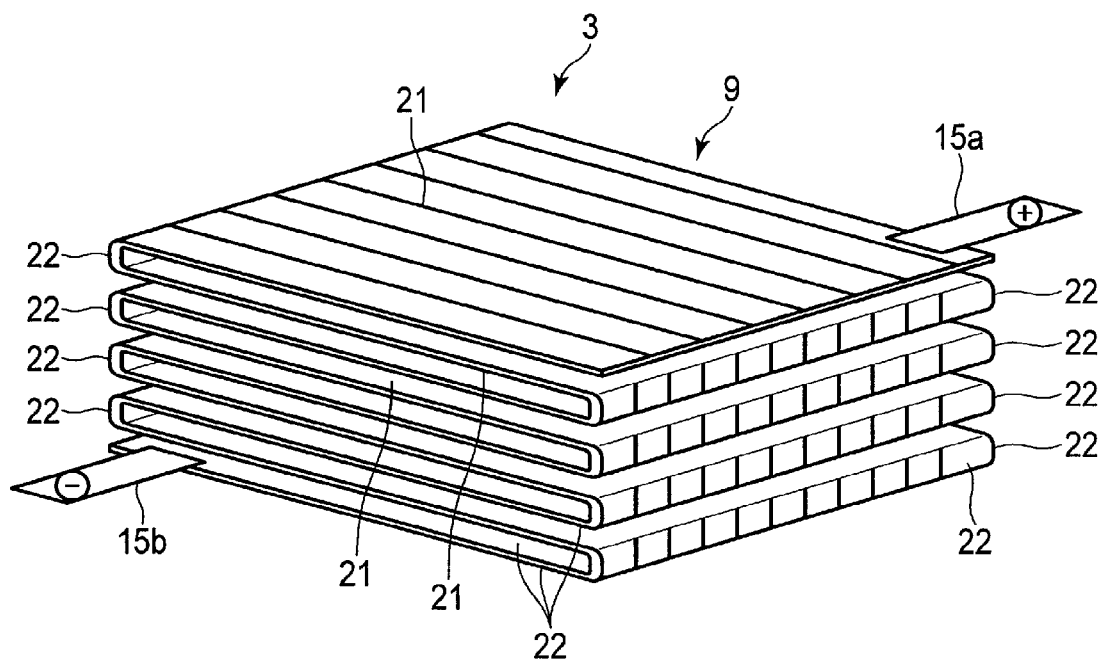
FIG. 11 is a perspective view showing a schematic structure of a laminated product of bi-polar electrodes of a non-aqueous electrolyte battery of a third embodiment.

FIG. 11 is a perspective view showing a schematic structure of a laminated product 9 of bi-polar electrodes 8 of a non-aqueous electrolyte battery of a third embodiment. The present embodiment is a second type electrode group 3 of the bi-polar electrodes 8 in which the laminated product 9 of the bi-polar electrodes 8 shown in FIG. 5 is divided into a plurality of parts with a predetermined length in one direction and the divided parts 21 are sequentially and alternately bent, folded and layered in a zigzag shape.

Here, as shown in FIG. 11, a pyroelectric tab 15a for a positive electrode is formed on an end of one side portion (an upper side portion in FIG. 11) of the electrode group 3. A pyroelectric tab 15b for a negative electrode is formed on an end of the other side portion (a lower side portion in FIG. 11) of the electrode group 3.

The electrode group 3 of the bi-polar electrodes 8 of the present embodiment is housed in an outer case having a substantially rectangular shape.

In this embodiment, since the second type electrode group 3 of the bi-polar electrodes 8 is structured by folding and laying the laminated product 9 of the bi-polar electrodes 8 shown in FIG. 5 in a zigzag shape, it is possible to achieve high energy density and low resistance of the non-aqueous electrolyte battery 1 that is the bi-polar battery having a small volume, and it is possible to prevent liquid junction and to facilitate its fabrication.

Fourth Embodiment

FIG. 12 is a perspective view showing a schematic structure of a laminated product 9 of bi-polar electrodes 8 of a non-aqueous electrolyte battery of a fourth embodiment. In this embodiment, as shown in FIG. 12, the laminated product 9 is folded and layered in a zigzag shape in a battery cell side-by-side direction of the laminated product 9 (a direction perpendicular to the folding direction of the laminated product 9 of the third embodiment in the zigzag shape).

As shown in FIG. 12, a pyroelectric tab 15a for a positive electrode is formed on an end of one side portion (an upper side portion in FIG. 12) of the electrode group 3 of the bi-polar electrodes 8. A pyroelectric tab 15b for a negative electrode is formed on an end of the other side portion (a lower side portion in FIG. 12) of the electrode group 3 of the bi-polar electrodes 8.

In this embodiment, like in the electrode group 3 of the bi-polar electrodes 8 of the third embodiment, the second type electrode group 3 of the bi-polar electrodes 8 is structured by folding and laying the laminated product 9 of the bi-polar electrodes 8 showing in FIG. 5 in a zigzag shape. Therefore, like in the third embodiment, it is possible to achieve high energy density and low resistance of the non-aqueous electrolyte battery 1 that is the bi-polar battery having a small volume, and it is possible to prevent liquid junction and to facilitate its fabrication.

Fifth Embodiment

FIG. 13 is a perspective view showing a schematic structure of an electrode group of one bi-polar electrode of a non-aqueous electrolyte battery of a fifth embodiment. In this embodiment, the electrode group 3 has a single structure structured by only one bi-polar electrode 8 in which a positive-pole active material layer 11 is formed on one surface of a pyroelectric member 10 and a negative-pole active material layer 12 is formed on the other surface of the pyroelectric member 10. And, in order to make the electrode group 3 being a second type, the only one bi-polar electrode 8 is divided into a plurality of parts 31 with a predetermined length in one direction and the divided parts 31 are sequentially and alternately bent, folded and layered 31 in a zigzag shape.

In this embodiment, like in the electrode groups 3 of the bi-polar electrodes 8 of the third and fourth embodiments, it is possible to achieve high energy density and low resistance of the non-aqueous electrolyte battery 1 that is the bi-polar battery having a small volume, and it is possible to prevent liquid junction and facilitate its fabrication.

Further, the second type electrode group 3 may be structured by providing a laminated product in which the bi-polar electrodes 8 are laminated in multiple stages in their thickness direction while a non-aqueous electrolyte layer (separator) 13 is interposed between the the negative-pole active material layer 12 of one bi-polar electrode 8 and the positive-pole active material layers 11 of the other bi-polar electrode 8 adjacent to the one bi-polar electrode 8, dividing the laminated product into a plurality of parts with a predetermined length in one direction, and sequentially and alternately bending, folding and layering the divided parts 31 in a zigzag shape.

Figure 15:
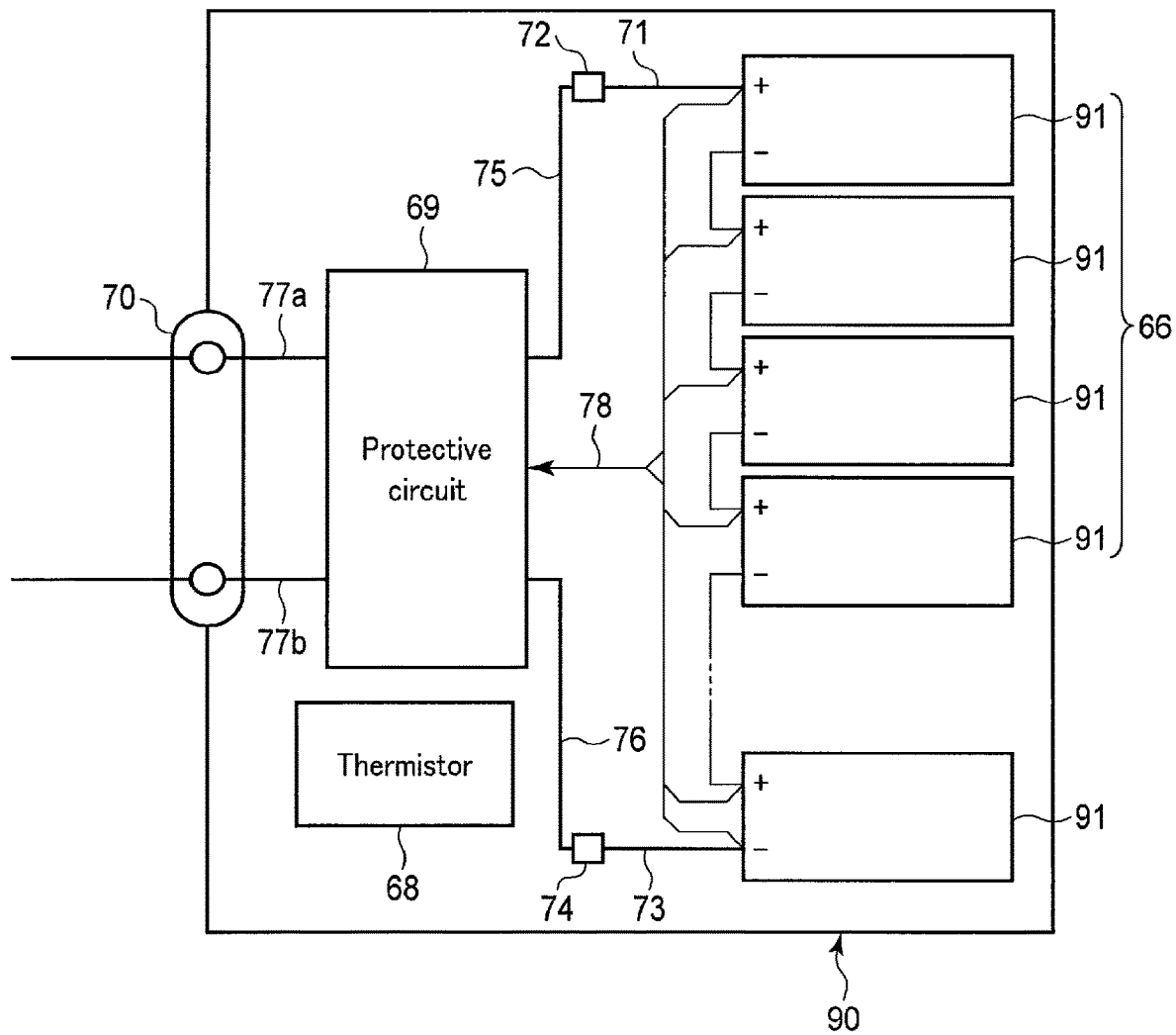
FIG. 15 is a block diagram showing an electric circuit of the battery pack of FIG. 14.

FIG. 14 is an exploded perspective view showing a schematic structure of a battery pack 90 incorporated with the non-aqueous electrolyte battery 1 of any one of the first to fifth embodiments. FIG. 15 is a block diagram showing an electric circuit of the battery pack 90 of FIG. 14. The battery pack 90 shown in FIGS. 14 and 15 includes a plurality of single batteries 91. The single battery 91 is the non-aqueous electrolyte battery 1 of any one of the above described first to fifth embodiments.

The plurality of single batteries 91 are stacked such that outwardly extended negative electrode terminals 63 are aligned in the same direction and outwardly extended positive electrode terminals 64 are aligned in the same direction, and these single batteries 91 are fastened by an adhesive tape 65 to structure a unit battery 66. These single batteries 91 are electrically connected in series to each other as shown in FIG. 15.

A printed circuit board 67 is arranged to face surfaces of the single batteries 91 from which the negative and positive electrode terminals 63 and 64 extend. As shown in FIG. 15, a thermistor 68, a protective circuit 69 and a terminal device 70 for electrically connecting to an external device are mounted on the printed circuit board 67. An insulating plate (not illustrated) for avoiding an unnecessary connection to wirings of the unit battery 66 is attached to a surface of the printed circuit board 67 facing the unit battery 66.

A positive electrode lead 71 is connected to the positive electrode terminal 64 arranged at the lowermost layer of the unit battery 66, and a tip thereof is inserted into and electrically connected to a positive electrode connector 72 of the printed circuit board 67. A negative electrode lead 73 is connected to the negative electrode terminal 63 arranged at the uppermost layer of the unit battery 66, and a tip thereof is inserted into and electrically connected to a negative electrode connector 74 of the printed circuit board 67. These connectors 72 and 74 are connected to the protective circuit 69 through wirings 75 and 76 formed on the printed circuit board 67. The thermistor 68 detects temperatures of the single batteries 91 and transmits temperature-detection signals to the protective circuit 69. The protective circuit 69 can shut down plus and minus side wirings 77a and 77b between the protective circuit 69 and the electrically connecting device 70 for the external device in a predetermined condition. One example of the predetermined condition is, for example a situation in which a temperature detected by the thermistor 68 is an equal to or greater than a predetermined temperature. Another example of the predetermined condition is, for example a situation in which overcharge, overdischarge, overcurrent or the like of the single battery 91 is detected. The detection of the overcharge or the like is performed on the individual single battery 91 or the entire unit battery 66.

In a case of detecting the individual single battery 91, a battery voltage may be detected and a positive electrode potential or a negative electrode potential may be detected. In the latter case, a lithium electrode for use as a reference electrode is inserted into the individual single battery 91. In a case of the battery pack 90 of FIGS. 14 and 15, wirings 78 for voltage detection are respectively connected to the single batteries 91. Detected signals are transmitted to the protective circuit 69 through these wirings 78.

Protective sheets 79 made of a rubber or a resin are arranged on three side surfaces of the unit battery 66, except for the side surface from which the positive electrode terminals 64 and the negative electrode terminals 63 protrude.

The unit battery 66, together with the protective sheets 79 and the printed circuit board 67, is housed in a container 80. That is, the protective sheets 79 are respectively arranged on both longitudinal inner side surfaces and one end inner side surface of the container 80, and the printed circuit board 67 is arranged on the other end inner side surface of the container 80 which is opposed to the one end inner side surface. Therefore, the unit battery 66 is arranged in a space surrounding the protective sheets 79 and the printed circuit board 67. A cap 81 is attached to a top end of the container 80.

A thermally shrinkable tape may be used instead of the adhesive tape 65 to fix the single batteries 91 of the unit battery 66. In this case, after the protective sheets 79 are arranged on the both side surfaces of the unit battery 66 and the thermally shrinkable tube is wound around them, the thermally shrinkable tube is thermally shrunken to bind the single batteries 91 of the unit battery 66.

The single batteries 91 are connected in series in FIGS. 14 and 15, but the single batteries 91 may be connected in parallel so as to increase a battery capacity. The assembled battery packs 90 can be connected in series and/or in parallel.

The structure of the battery pack 90 can be appropriately changed depending on a purpose of its use. The battery pack 90 is preferably used for a battery which desires cycle characteristics in large current.

The battery pack 90 is concretely used for a power source of a digital camera, a two-wheel to four-wheel hybrid electric vehicle, a two-wheel to four-wheel electric vehicle or an electric motor assisted bicycle. The battery pack 90 is preferable for, in particular, a vehicle.

According to these embodiments, it is possible to provide a bi-polar battery, a manufacturing method thereof, and a battery pack, capable of achieving high energy density and low resistance of the bi-polar battery in which a positive-pole active material layer is formed on one plate surface of a pyroelectric member and a negative-pole active material is formed on the other plate surface thereof.

While certain embodiments have been described, these embodiments have been presented by way of example only, and are not intended to limit the scope of the inventions. Indeed, the novel embodiments described herein may be embodied in a variety of other forms; furthermore, various omissions substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A non-aqueous electrolyte battery, comprising:
a laminated product including a plurality of bi-polar electrodes and one or more of non-aqueous electrolyte layers,
the bi-polar electrodes being laminated in a laminating direction, each of the bi-polar electrodes including a current collector, a positive-pole active material layer, and a negative-pole active material layer, a thickness direction of each of the bi-polar electrodes crossing the laminating direction, the current collector of each of the bi-polar electrodes including a first surface facing one side of the thickness direction, and a second surface facing a side opposite to the side where the first surface faces in the thickness direction, the positive-pole active material layer being disposed directly on and contacting directly to the first surface of the current collector in each of the bi-polar electrodes, the negative-pole active material layer being disposed directly on and contacting directly to the second surface of the current collector in each of the bi-polar electrodes, the positive-pole active material layer not being disposed on the second surface of the current collector in each of the bi-polar electrodes, the negative-pole active material layer not being disposed on the first surface of the current collector in each of the bi-polar electrodes, and
each of the non-aqueous electrolyte layers being interposed between the positive-pole active material layer of one of corresponding two of the bi-polar electrodes and the negative-pole active material layer of the other of the corresponding two of the bi-polar electrodes, the corresponding two of the bi-polar electrodes being adjacently laminated relative to each other in the laminating direction, and
wherein: the laminated product extends in a zigzag state along an extending direction, the extending direction of the laminated product being along the laminating direction; and
the current collector of each of the bi-polar electrodes has a step-like shape and comprises:
a first bent portion,
a second bent portion,
a first plate portion extending between the first bent portion and the second bent portion along the thickness direction,
a second plate portion extending along the laminating direction and connected to the first plate portion through the first bent portion, the positive-pole active material layer being disposed directly on and directly contacting to the second plate portion, and
a third plate portion extending along the laminating direction and connected to the first plate portion through the second bent portion, the negative-pole active material layer being disposed directly on and directly contacting to the third plate portion;
the laminated product is divided into a plurality of divided parts in the extending direction; the plurality of divided parts are stacked relative to one another due to the zigzag state; each of the divided parts includes two or more of the bi-polar electrodes; and two or more of the bi-polar electrodes in each of the divided parts are adjacently arranged relative to one another along the extending direction.

2. The non-aqueous electrolyte battery according to claim 1, wherein the negative-pole active material layer has a reaction potential of about 1.5 V.

3. The non-aqueous electrolyte battery according to claim 1, wherein the current collector comprises aluminum.

4. A battery pack, comprising the non-aqueous electrolyte battery according to claim 1.

5. The non-aqueous electrolyte battery according to claim 1, wherein a negative-pole active material of the negative-pole active material layer comprises a titanium-based oxide, a lithium titanium oxide, or a lithium titanium composite oxide comprising at least one element selected from a group consisting of Nb, Mo, W, P, V, Sn, Cu, Ni and Fe.

6. The non-aqueous electrolyte battery according to claim 5, wherein the lithium titanium oxide comprises a lithium titanate having a spinel structure, a titanium oxide having a bronze structure (B) or an anatase structure, a Ramsdellite type lithium titanate, or a niobium titanium oxide.

7. The non-aqueous electrolyte battery according to claim 6, wherein the lithium titanate having the spinel structure comprises $Li_4+xTi_5O_{12}$ ($0 \leq x \leq 3$).

8. The non-aqueous electrolyte battery according to claim 6, wherein the niobium titanium oxide comprises $Li_xNb_aTiO_7$ ($0 \leq x \leq 1$ and $1 \leq a \leq 4$).

9. The non-aqueous electrolyte battery according to claim 1, wherein the non-aqueous electrolyte battery is a lithium-ion secondary battery.

10. The non-aqueous electrolyte battery according to claim 1, wherein:
the positive-pole active material layer of one of corresponding two of the bi-polar electrodes faces the negative-pole active material layer of the other of the corresponding two of the bi-polar electrodes in the thickness direction, and
the corresponding two of the bi-polar electrodes are adjacently laminated relative to each other in the laminating direction.

* * * * *